April 1, 1969 J. M. LIND 3,436,228
METHOD OF TREATING DOUGH BEFORE BAKING
Filed Aug. 13, 1965 Sheet 2 of 2
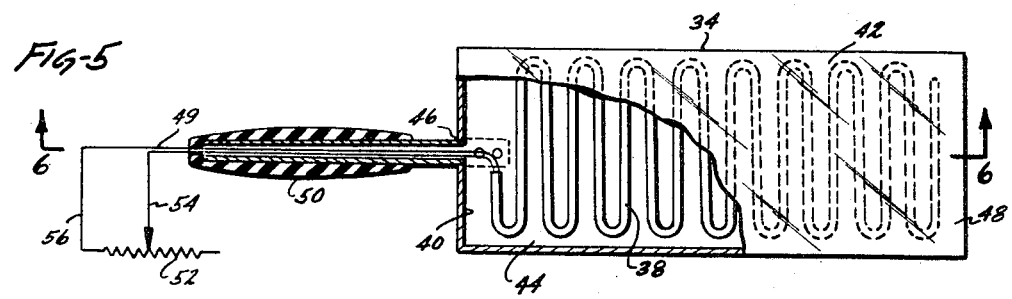
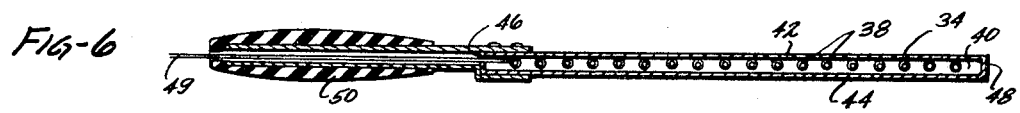
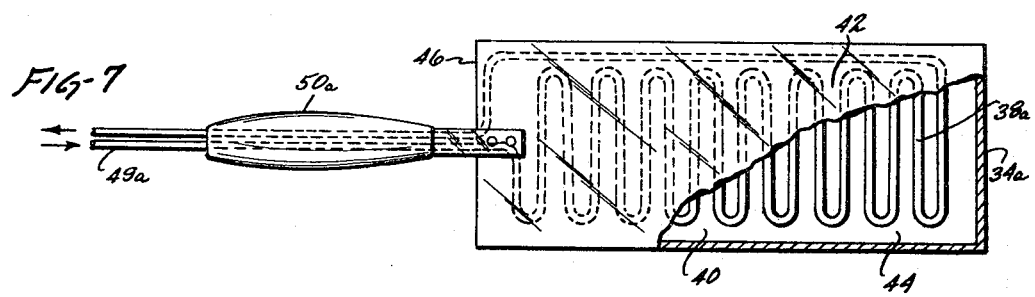
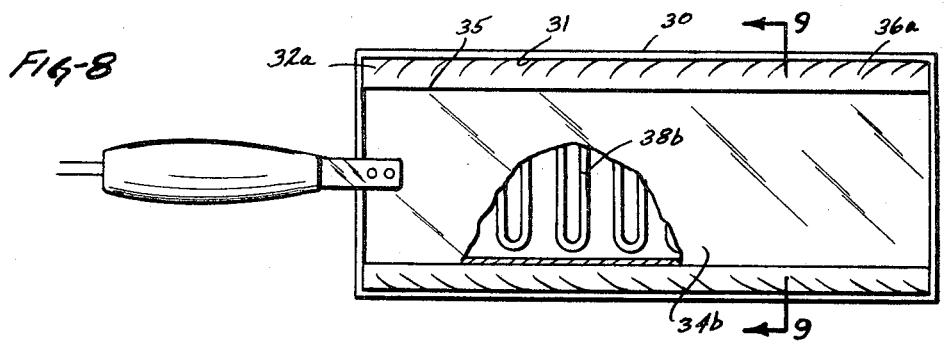
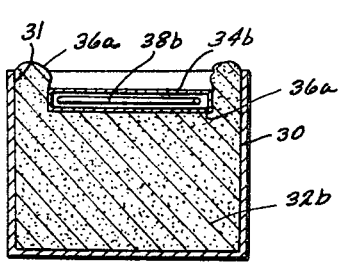
INVENTOR
JOSEPH M. LIND
BY Herzig, Walsh & Blackham
ATTORNEYS United States Patent Office 3,436,228
Patented Apr. 1, 1969

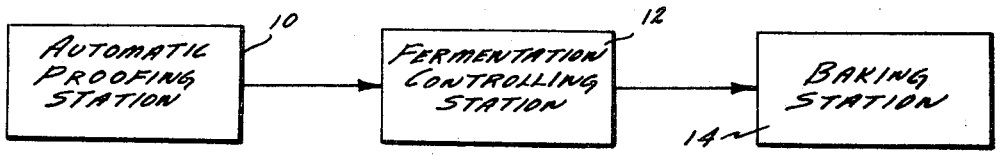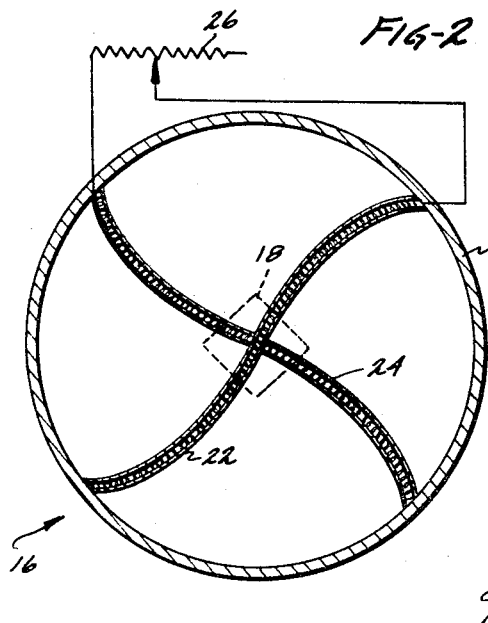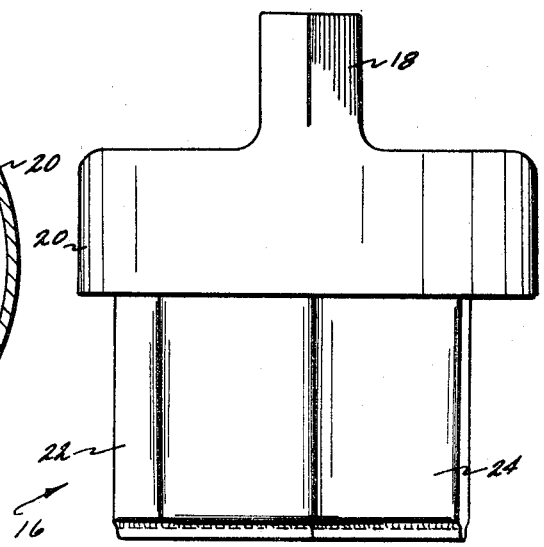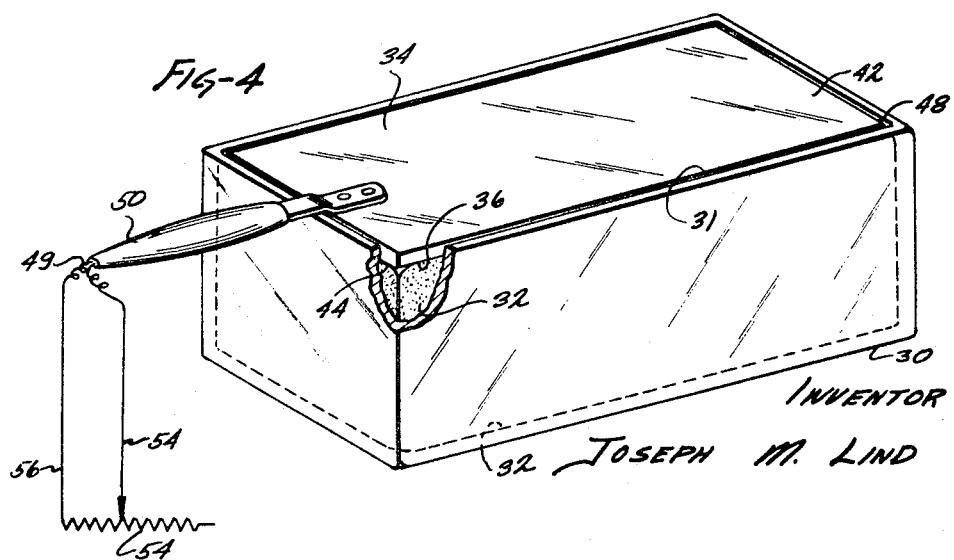

3,436,228
METHOD OF TREATING DOUGH
BEFORE BAKING
Joseph M. Lind, 400 N. Sycamore Ave.,
Los Angeles, Calif. 90036
Filed Aug. 13, 1965, Ser. No. 480,255
Int. Cl. A21d 6/00
U.S. Cl. 99—90                                    6 Claims

ABSTRACT OF THE DISCLOSURE

A mass of leavened dough is proofed and then the temperature of selected surface area portions is changed sufficiently to arrest all further fermentation at those areas while applying pressure to those areas to change the shape of the mass, then baking the mass. The temperature change may be either by heating or cooling and the pressure may be mere surface area pressure or cutting.

---

The present invention relates to new and useful apparatus for and a method of treating dough before baking and more particularly to new and useful apparatus for and a method of controlling of the rising of unbaked dough to stop fermentation in selected portions of the dough as it emerges from an automatic proofer.

One step in the art of baking leavened dough is to pass the unbaked dough through a proofing box or proofer which automatically controls the amount of raising of the dough. However, since the leavening agent is still producing fermentation in the dough, it will continue rising as it passes from the proofer to the oven and during the early stages of baking.

When it is desired in the prior art baking process to produce the well known "sandwich" loaf of bread which is substantially square in cross section, it has been customary to place a lid on the pan of unbaked bread to physically prevent the bread from rising to its customary rounded mound.

While generally satisfactory from the standpoint of obtaining a loaf of bread which will produce rectangular slices, this method of producing sandwich loaves has the disadvantages of adding to the first cost of the equipment necessary to bake the bread in that the lids must be provided for each individual baking pan. In addition, it is time consuming to both place a lid on each pan before it enters the oven and then remove the lid after the pan emerges from the oven.

Other prior art baking of leavened dough includes making sweet goods which are cut into predetermined shapes prior to the baking operation. While generally satisfactory, this method of baking sweet goods has the disadvantage that the dough continues to rise along the cut edge after the cutting step has been performed so that a non-uniform edge is produced resulting in a less attractive product than would be the case were the edges uniform.

In view of the foregoing factors and conditions characteristic of prior art apparatus and methods of treating dough before baking, it is the primary object of the present invention to provide new and useful apparatus for and a method of treating dough before baking not subject to the disadvantages enumerated above which will prevent leavened dough from rising safely, efficiently and economically.

Another object of the present invention is to provide apparatus for stopping dough fermentation in bakery goods by subjecting the surface of said goods to a sufficient temperature differential to kill the enzymes in the leavened dough at selected surface areas thereof.

A further object of the present invention is to provide a new and useful method of stopping dough fermentation in bakery goods which includes the step of subjecting the surface of the goods to a sufficient temperature differential to kill the enzymes in the dough at the surface.

A still further object of the present invention is to provide a new and useful tool for cutting leavened dough to produce sweet goods having a predetermined shape.

According to the present invention, a new and useful apparatus for and method of stopping dough fermentation in bakery goods are provided. The apparatus includes means for applying a temperature differential to selected surface areas of proofed dough to kill the enzymes therein and, thus, prevent further rising of the dough.

One form of the apparatus of the present invention includes a plate having means provided therein, such as a heating element or a cooling element, to subject the surface of a proofed loaf of bread to a sufficient temperature differential to kill the enzymes. The plate is so dimensioned that it will just fit into the top of a baking pan where it contacts the upper surface of the proofed bread.

Another form of the apparatus of the present invention comprises a new and useful tool for cutting sweet goods. The cutting edges of the tool include means for applying a temperature differential to the cut edge of the leavened dough of sufficient magnitude to kill the enzymes along the cut edge and prevent further raising of the dough, thereby providing uniform edges on the baked product.

In another form of apparatus of the present invention, a plate is again provided for applying a temperature differential to the surface of a loaf of bread prior to the baking operation. The plate is of sufficient length to fill the top of a baking pan lengthwise, but is of less width than the open top of the baking pan so that, when the plate is applied to a loaf of bread as it leaves the proofing station, the enzymes in the central portion of the upper surface of loaf will be killed leaving the outer edges free to rise further producing a loaf having an upper surface which has flat central portion edges by upwardly-extending, rounded portions.

The features of the present invention which are believed to be novel are set forth by particularity in the appended claims. The present invention, both to its organization and manner or operation, together with further objects and advantages thereof, may best be understood by reference to the following description, taken in connection with the accompanying drawings in which like reference characters refer to like elements in the several views.

In the drawings:

FIGURE 1 is a flow diagram of the methods steps employed in the present invention;

FIGURE 2 is a bottom view of a tool of the present invention employed to cut leavened dough into predetermined shapes prior to the baking thereof;

FIGURE 3 is an elevational view of the tool shown in FIGURE 2;

FIGURE 4 is a perspective view of a baking pan having a temperature-differential plate of the present invention in an operative position;

FIGURE 5 is a plain view of the plate shown in FIGURE 4 with portion broken away to show internal construction;

FIGURE 6 is a cross-sectional view taken along line 6—6 of FIGURE 5;

FIGURE 7 is a plan view of one modified temperature-differential plate of the present invention;

FIGURE 8 is a plan view showing another modified pressure-differential plate in position in a baking pan; and FIGURE 9 is a cross-sectional view taken along line 9—9 of FIGURE 8.

Referring again to the drawings and particularly to FIGURE 1, according to the present invention, leavened dough is placed in an automatic proofing station 10 where the leavening agent produces a fermentation in the dough causing a certain amount of raising of the dough into a mound. The proofing station 10 automatically controls the amount of raising so that a predetermined height of mound can be obtained. After the proofed dough leaves the station 10, it moves to a fermentation controlling station 12 where the proofed dough is treated with apparatus of the present invention in accordance with the method of the present invention to prevent further fermentation in preselected areas by killing the enzymes at the surface of these areas after which the dough passes to a baking station 14 where it is baked in well known manner.

Referring now to FIGURES 2 and 3, a tool 16 of the present invention may be used for cutting the fermenting dough at station 12 into predetermined shapes suitable for use in baking sweet goods. The tool 16 includes a shank 18 for connecting it to a suitable actuator, not shown, a body portion 20 and a cutter 22. The cutter 22 may take any suitable shape depending upon the type of sweet goods to be produced, as will be readily understood by those skilled in the baking art.

Further raising of the proofed dough along its cut edges is prevented by killing the enzymes in the dough along these edges. This is accomplished by providing the cutter 22 with suitable temperature-differential means 24 which is shown herein for purposes of illustration, but not of limitation, as comprising a heating element of the electrical-resistance type the temperature of which is controlled by a suitable variable resistor 26. The heating element 24 is adapted to treat the cut edges of the dough with a temperature within a range of 140–400 degrees F. to sear the cut edges so that further fermentation therealong will be prevented. Since further fermentation is prevented along the cut edges, they will remain uniform during the baking operation. This enhances the appearance of the finished product making it more uniform than was possible in the prior art where the cut edges continued to rise after leaving the cutting table.

Referring now to FIGURES 4–6, a conventional baking pan 30 containing a proofed loaf of bread 32 is sent from proofing station 10 to the fermentation controlling station 12 where a temperature-differential plate 34 is applied to the upper surface 36 of the proofed loaf 32 through the open top 31 of pan 30 for a very short period of time after which the plate 34 is removed and the pan 30 is sent to the baking station 14 where the loaf 32 is baked in a well known manner. A brief contact of the plate 34 with the surface 36 kills the enzymes at the surface of the loaf 32 preventing further fermentation in the loaf 32. Since the surface 36 can not raise further after treatment with the plate 34, the finished loaf 32 will have a flat surface 36 so that the loaf 32 is substantially square in cross section. The length of time which the plate 34 remains in contact with the surface 36 depends upon the temperature of the plate. It has been found that a plate 34 having an elevated temperature of approximately 200° F. may be applied to the surface 36 for approximately one second whereupon the enzymes are killed to a depth of approximately 1/32". It has also been found that when the surface 36 is treated with a plate to be hereinafter described having a temperature of approximately −10° F. for one second, the same result accrues.

The plate 34 may be heated to an elevated temperature ranging from about 140° F. to about 400° F. by any suitable means, such as an electrical-resistance type heating element 38 which may be disposed within a chamber 40 formed in the plate 34 by a topwall 42, a bottomwall 44 and end walls 46 and 48. Electrical current may be supplied to the heating element 38 by a conductor 49 which extends through the end wall 46 and through a handle 50 used for positioning the plate 34 in the pan 30 and removing it therefrom. The temperature of the heating element 38 is controlled by a suitable variable resistor 52 which is connected to the conductor 49 by leads 54 and 56.

Referring now to FIGURE 7, a modified temperature-differential plate 34a is shown which may be identical to the plate 34 except that a refrigeration coil 38a is substituted for the heating element 38 so that the surface 36 may be subjected to a freezing temperature to freeze the enzymes in the surface of the loaf 32. Refrigerant for the coil 38a may be supplied through a conduit 49 which extends through the handle 50a. As previously noted, a temperature of approximately −10° F. when applied to the surface 36 for one second will satisfactorily prevent further raising of the surface 36 by killing the enzymes therein to a depth of approximately 1/32". It has also been found that a temperature of approximately −20° F. will kill the enzymes to the same depth when applied to the surface 36 for approximately ½ second. It has been further found that an elevated temperature of 300° F. when applied to the surface 36 for ¾ second kills the enzymes to 1/32" and that 400° F. applied for ½ second kills the enzymes to a depth of 1/32". This depth of kill is sufficient for most purposes for producing the flat surface 36 in the case of a sandwich loaf and for producing a uniform cut along the cut edge of sweet goods with the tool 16. When it is desired to kill the enzymes to a greater depth, for example, ⅛", the time of application must be increased nearly 3–4 fold because the searing action forms an insulated barrier making the kill time greater than merely proportional to the depth of kill.

If it is desired to produce a loaf of bread having a different shape than the conventional sandwich loaf, a loaf having a flat central portion with raised sides may be produced as shown in FIGURES 8 and 9 by employed the usual pan 30 having an open top 31 in which a loaf of proofed bread 32a is provided. A temperature-differential plate 34b having a heating element 38b is provided. The plate 34b has a length substantially equal to the length of the open top 31, but a width substantially less and is applied to the surface 36a of the loaf 32a. Since the plate 34b is not as wide as the surface 36a, the loaf 32a will continue to rise in the space between the open top 31 of the pan and the edge 35 of the plate 34b while surface 36a is prevented from raising in the area contacted by the plate because the enzymes have been killed. Thus, a loaf of bread having the approximate cross section shown in FIGURE 9 will result after the plate 34b has been removed and the loaf is baked in the baking station 14.

It is apparent that many interesting and varied patterns of baked dough can be produced by killing the enzymes in predetermined portions of the surface of the dough after it leaves the proofing station 10 and before it arrives at the baking station 14.

A few examples of the method of the present invention are as follows:

Example 1

A sheet of leavened dough for sweet goods was proofed in the proofing station 10 in conventional manner. The proofed dough was then sent to the fermentation controlling station 12 where individual pieces were cut from the sheet with the tool 16 having its cutter 22 heated to a temperature within the range of approximately 140–400° F. The heated cutter seared the cut edges thereby stopping further fermentation therealong. The cut dough was then sent to the baking station 14 where it was baked in conventional manner. The cut edges of the baked product were uniform.

Example 2

Proofed dough may be cut as in the preceding Example 1 except that a cutter having a temperature of approximately −10° to −20° F. may be used.

Example 3

Leavened dough was placed in a bakery pan and proofed at the automatic proof station 10 in conventional manner. The proofed dough was then sent to the fermentation controlling station 12 where a temperature-differential plate 34 having a temperature of approximately 200° F. was applied to the surface 36 of the proofed dough for approximately 1 second. This killed the enzymes in a surface area under the plate 34 to a depth of approximately $\frac{1}{32}$ inch preventing further raising of the proofed loaf. The loaf was then sent to the baking station 14 and baked in conventional manner. The finished product had a substantially square cross section.

Example 4

A loaf of proofed dough may be treated in accordance with the foregoing Example 3 except that a temperature-differential plate having a temperature of −20° F. may be applied to the surface 36 for approximately one second.

Example 5

A loaf of proofed dough may be treated as in the foregoing Example 3 except that a temperature-differential plate having a temperature of approximately 300° F. may be applied to the surface 36 for approximately ¾ second.

Example 6

A proofed loaf of bread may be treated as in the foregoing Example 3 except that a temperature-differential plate having a temperature of approximately 400° F. may be applied to the surface 36 for approximately ½ second.

Example 7

A proofed loaf was treated as in Example 3 except that a temperature-differential plate having a temperature of −10° F. was applied to the proofed loaf for one second.

Example 8

A proofed loaf was treated at station 12 as in Example 3 except that a temperature-differential plate having a temperature of approximately 200° F. was placed on the upper surface 36 along the central portion thereof leaving the edges between the plate 34 and the pan 30 exposed. The plate treated the surface for approximately one second after which the loaf was sent to the oven for baking. The resulting loaf had a depressed, flat central portion with raised edges adjacent each side thereof and extending along the full length of the loaf.

While the particular apparatus for and method of treating leavened dough before baking herein shown and described in detail are fully capable of attaining the objects and providing advantages hereinbefore stated, it is to be understood that they are merely illustrative of the presently preferred embodiments of the invention and that no limitations are intended to the details of construction, design or method steps herein shown and described in detail other than as defined in the appended claims.

What is claimed is:

1. A method of treating a mass of leavened dough comprising the steps of:
    proofing the leavened mass of dough;
    subjecting predetermined areas, less than the total exterior surface area of said mass, to a sufficient temperature change to arrest fermentation in said dough at said areas, and applying sufficient pressure to said areas to change the shape of said mass; and thereafter;
    baking the subjected mass whereby a product of predetermined controlled shape is produced.
2. The method of claim 1 wherein said temperature changing step comprises raising the temperature of said areas to 140° to 400° F.
3. The method of claim 2 wherein said temperature is raised to approximately 200° F. and maintained at said temperature for approximately one second.
4. The method of claim 1 wherein said temperature changing step comprises lowering the temperature of said areas to −10° to −20° F.
5. The method of claim 1 wherein said pressure applying step comprises cutting said mass while changing the temperature of the cut surfaces.
6. The method of claim 1 wherein said pressure applying step comprises pressing a continuous surface area of said mass to flat planar shape while changing the temperature of said area.

References Cited

UNITED STATES PATENTS

| | | | |
|---|---|---|---|
| 1,044,179 | 11/1912 | Horner | 99—90 |
| 1,383,681 | 5/1921 | Wallburg | 83—16 |
| 2,660,134 | 11/1953 | Bertrand | 107—54 |
| 3,048,129 | 8/1962 | Noel | 107—54.2 |

LIONEL M. SHAPIRO, *Primary Examiner.*

U.S. Cl. X.R.

99—92; 107—4, 7, 54; 83—15